UNITED STATES PATENT OFFICE 2,666,054

SUBSTITUTED PYRAZINES AND METHOD OF PREPARING THE SAME

Sidney R. Safir, River Edge, N. J., assignor to American Cyanamid Company, New York, N. Y., a corporation of Maine No Drawing. Application November 23, 1949, Serial No. 129,190

8 Claims. (Cl. 260—250)

The present invention relates to new organic compounds. More particularly, it relates to aliphatic and aromatic substituted 1-hydroxy-2-keto-1,2-dihydropyrazines and methods of preparation thereof.

White (Science 92: 127 (1940)) disclosed that the mold *Aspergillus flavus* will readily grow in liquid media yielding filtrates that are definitely bactericidal for some gram negative as well as gram-positive bacteria. The active component of the filtrates was later called "aspergillic acid" and was found to have the chemical structure 1-hydroxy-2-keto-3-(6)-isobutyl-6-(3)-sec.-butyl-1,2-dihydropyrazine.

I have now found that other substituted 1-hydroxy-2-keto pyrazines have bactericidal properties similar to aspergillic acid. These compounds may be illustrated by the following general formula:

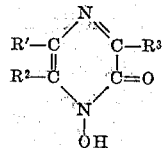

in which R' is an alkyl or aryl radical and R² is a hydrogen, alkyl or an aryl radical and R³ is an alkyl or hydroxamic acid radical.

The compounds of the present invention are, in general, light yellow to white crystalline solids. They are soluble in dilute alkali except where R' and R² are aryl radicals, give a red color with ferric chloride and produce green copper salts characteristic of hydroxamic acids.

The compounds are prepared by reacting an alpha,beta-dicarbonyl compound with an aminoalkylhydroxamic acid or aminoalkyldihydroxamic acid. The reaction which takes place may be illustrated by the following equation:

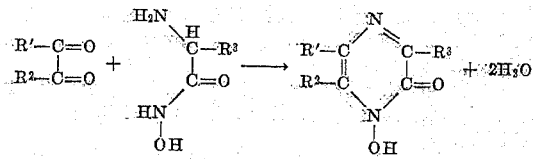

in which R', R² and R³ are as previously defined.

The vicinal dicarbonyl compounds may be compounds such as diacetyl, propionyl acetyl, dipropionyl, benzil and the like.

The aliphatic hydroxamic acids may be compounds such as aminomalondihydroxamic acid, L-leucinehydroxamic acid, DL-isoleucinehydroxamic acid, norleucinehydroxamic acid, alaninehydroxamic acid, valinehydroxamic acid, alpha-amino n-butyrohydroxamic acid, alpha-amino-isobutyrohydroxamic acid, alpha-amino n-valerohydroxamic acid, alpha-amino-alpha-methyl n-butyrohydroxamic acid, and the like.

The reaction to produce the compounds of the present invention is carried out by mixing the intermediates in a solvent. Although water is preferred there may also be present water miscible solvents such as methanol, ethanol, etc. The reaction is slightly exothermic and proceeds immediately on mixing the intermediates.

The reaction will take place readily at room temperature although a temperature of from 0° C. to about 100° C. may be used. The reaction is completed in from a few minutes up to 17 hours. The product can generally be recovered by filtration and purified by recrystallization or vacuum sublimation.

The following examples will illustrate the process of the present invention is greater detail.

Example 1

To a solution of 0.9 g. of diacetyl in 10 cc. of water there is added 1 g. of aminomalondihydroxamic acid. Upon shaking vigorously, an almost clear solution results whereupon a separation of a yellow crystalline substance takes place rapidly. The reaction is accompanied by a very small rise in temperature. After allowing to stand for one and one-half hours, the product is filtered and washed with water. The 1-hydroxy-2-keto-5,6-dimethyl-1,2-dihydropyrazino-3-hydroxamic acid is then purified by recrystallization from water; melting point 212°–214° (dec.). The melting point varies with the rate of heating and on some samples the melting point was as high as 220°–222° (dec.).

The pure product is relatively insoluble in cold water and alcohol and is soluble in hot water. An aqueous solution gives an acid reaction to "alkacid" test paper. The compound dissolves readily in dilute sodium carbonate as well as in dilute sodium hydroxide. The substance also gives a red color with ferric chloride, and an aqueous solution gives a green precipitate when treated with cupric acetate.

Example 2

A mixture of 8 g. of L-leucinehydroxamic acid, 7.5 g. of diacetyl and 50 cc. of water is shaken for a few minutes whereupon a clear solution results accompanied by a slight evolution of heat. The solution is then allowed to stand at room temperature for two days. A light yellow crystalline solid separates and is filtered. The yield of 1-hydroxy-2-keto-3-isobutyl-5,6-dimethyl-1,2-dihydropyrazine is 4 g., melting point 96°–98° C. A sample of this material was sublimed at 100°–110° at 0.05 mm. yielding a white crystalline sublimate which melted at 68°–70° C. On standing overnight the white solid changes to a light yellow solid and melts at 96°–98° C. The solids melting at 68°–70° C. and at 96°–98° C. appear to be dimorphous modifications of the same substance.

*Example 3*

A mixture of 4.6 g. of DL-isoleucinehydroxamic acid, 4 g. of diacetyl and 15 cc. of water is shaken in a stoppered flask for a few minutes whereupon a clear solution results. Within a few minutes the product begins to crystallize. After standing for two days, it is filtered, washed with water and dried; yield 3.5 g. The 1-hydroxy-2 - keto - 3 - sec. butyl - 5,6 - dimethyl - 1,2-dihydropyrazine obtained has a melting point of 87° to 90° C.

*Example 4*

A mixture of 6 g. of aminomalondihydroxamic acid and 11.6 g. of 30% aqueous glyoxal is shaken vigorously for a few minutes whereupon the mixture grows warm and a clear solution results. Upon cooling and standing the 1-hydroxy-2-keto-1,2-dihydropyrazine-3-hydroxamic acid separates as orange crystals; yield 2.3 g., melting point 183°–185° C. (dec.).

*Example 5*

A mixture of 4.2 g. of benzil, 3.45 g. of L-leucine-hydroxamic acid and 100 cc. of 50% ethanol is refluxed seventeen hours and the resulting light brown product is filtered, washed with 1 N hydrochloric acid and recrystallized from benzene. The product is obtained in the form of white needles, having a melting point of 215°–217° C. (dec.). On analysis for carbon, hydrogen and nitrogen the values obtained agreed very closely with the theoretical values for 1-hydroxy-2 - keto - 3 - isobutyl - 5,6 - diphenyl - 1,2-dihydropyrazine.

I claim:

1. 1 - hydroxy - 2 - keto - 5,6 - dimethyl-1,2-dihydropyrazino-3-hydroxamic acid.
2. 1 - hydroxy - 2 - keto - 3 - isobutyl - 5,6-diphenyl-1,2-dihydropyrazine.
3. A method which comprises mixing together in a solvent a compound having the formula:

in which R′ and R² are lower alkyl radicals and a compound having the formula:

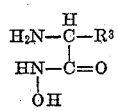

in which R³ is a lower alkyl radical, whereby compounds having the general formula:

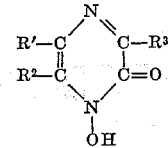

in which R′, R² and R³ are as defined above, are produced and recovered.

4. A method which comprises reacting together in a substantially aqueous solvent diacetyl and L-leucinehydroxamic acid whereby 1-hydroxy - 2 - keto - 3 - isobutyl - 5,6 - dimethyl-1,2-dihydropyrazine is produced and recovered.
5. A method which comprises reacting together in a substantially aqueous solvent diacetyl and aminomalondihydroxamic acid whereby 1-hydroxy - 2 - keto - 5,6 - dimethyl - 1,2 - dihydropyrazino-3-hydroxamic acid is produced and recovered.
6. A method which comprises reacting together in a substantially aqueous solvent diacetyl and DL-isoleucinehydroxamic acid whereby 1-hydroxy - 2 - keto - 3 - sec. butyl - 5,6 - dimethyl-1,2-dihydropyrazine is produced and recovered.
7. A 1 - hydroxy - 2 - keto - 3 - lower alkyl-1,2-dihydropyrazine-5,6-di-monocyclic aromatic hydrocarbon.
8. A method which comprises mixing together in a solvent a compound having the formula:

in which R′ is a member of the group consisting of lower alkyl and monocyclic aromatic hydrocarbon radicals and R² is a member of the group consisting of hydrogen, lower alkyl and monocyclic aromatic hydrocarbon radicals and a compound having the formula:

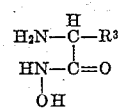

in which R³ is a member of the group consisting of lower alkyl and hydroxamic acid radicals whereby compounds having the general formula:

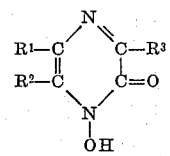

in which R′, R² and R³ are as defined above, are produced and recovered.

SIDNEY R. SAFIR.

References Cited in the file of this patent

Hackh, Chemical Dictionary, Second Ed. (1937), p. 457, P. Blakiston's Son and Co., Inc., Phila., Pa.

Dunn et al., J. Chemical Soc., 1949, 2707–2712.

Dutcher et al., J. Biol. Chem., 155 359–360 (1944).

Shaw et al., J. Am. Chem. Soc., 71 67–70 (1949).